United States Patent
Reial et al.

(10) Patent No.: US 8,995,499 B2
(45) Date of Patent: Mar. 31, 2015

(54) METHOD AND APPARATUS FOR SIGNAL QUALITY REPORTING FOR INTERFERENCE-CANCELLATION RECEIVERS

(71) Applicant: Telefonaktiebolaget L M Ericsson (publ), Stockholm (SE)

(72) Inventors: Andres Reial, Malmö (SE); Andreas Cedergren, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/930,686

(22) Filed: Jun. 28, 2013

(65) Prior Publication Data

US 2015/0003337 A1   Jan. 1, 2015

(51) Int. Cl.
- *H04B 1/00* (2006.01)
- *H04L 5/00* (2006.01)
- *H04L 1/00* (2006.01)

(52) U.S. Cl.
CPC ............ *H04L 5/0057* (2013.01); *H04L 1/0003* (2013.01); *H04L 1/0009* (2013.01)
USPC ........... 375/148; 375/130; 375/260; 375/267; 375/340; 375/343

(58) Field of Classification Search
CPC ............... H04B 1/7103; H04B 1/7107; H04B 1/71072; H04B 7/0632; H04B 17/005; H04W 28/048; H04L 5/0057; H04L 1/0009; H04L 1/0003
USPC ......... 375/136, 147, 148, 260, 262, 265, 267; 370/203, 204, 205, 208, 209
See application file for complete search history.

(56) References Cited

U.S. PATENT DOCUMENTS

| | | |
|---|---|---|
| 6,922,434 B2 | 7/2005 | Wang et al. |
| 7,773,951 B2 | 8/2010 | Molnar et al. |

(Continued)

FOREIGN PATENT DOCUMENTS

| | | |
|---|---|---|
| WO | 2007147506 A1 | 12/2007 |
| WO | 2009123515 A1 | 10/2009 |

(Continued)

OTHER PUBLICATIONS

Khan, Asif A., "Interference Management for Heterogeneous Networks in 3GPP LTE Advanced and Beyond", KTH Information and Communication Technology, Master of Science Thesis, TRITA-ICT-EX-2011:232, Stockholm, Sweden, 2011, pp. 1-131.

(Continued)

*Primary Examiner* — Dhaval Patel
(74) *Attorney, Agent, or Firm* — Murphy Bilak & Homiller, PLLC

(57) ABSTRACT

In one aspect, the teachings herein disclose a method and apparatus for signal quality reporting from a wireless apparatus that better reflects the actual interference cancellation efficiency expected at the wireless apparatus for a given transmission interval. In one example, the wireless apparatus knows or predicts the particular modulation and coding schemes (MCSs) that will be used in the transmission of one or more interferer signals for a transmission interval of interest. In turn, it uses those MCS values to estimate the actual interference cancellation efficiency the wireless apparatus will achieve with respect to those interferers. The wireless apparatus estimates and reports signal quality according to its estimated interference cancellation efficiency. Such processing allows the supporting wireless communication network to improve throughput by more aggressively scheduling the wireless apparatus for transmission intervals during which the wireless apparatus exhibits higher interference cancellation efficiency.

19 Claims, 8 Drawing Sheets

(56) References Cited

U.S. PATENT DOCUMENTS

| | | |
|---|---|---|
| 7,782,987 B2 | 8/2010 | Jonsson |
| 7,856,243 B2 | 12/2010 | Gunnarsson et al. |
| 8,218,606 B2 | 7/2012 | Jonsson |
| 8,224,278 B2 | 7/2012 | Cairns |
| 8,254,325 B2 | 8/2012 | Niewczas et al. |
| 8,340,202 B2 | 12/2012 | Huss et al. |
| 8,432,874 B2 | 4/2013 | Bjorkegren |
| 2007/0177501 A1 | 8/2007 | Papasakellariou |
| 2007/0183544 A1 | 8/2007 | Lee et al. |
| 2007/0275722 A1 | 11/2007 | Thorson et al. |
| 2009/0088080 A1 | 4/2009 | Zhang et al. |
| 2009/0088172 A1 | 4/2009 | Lusky et al. |
| 2009/0316591 A1 | 12/2009 | Reial et al. |
| 2011/0103520 A1 | 5/2011 | Molnar |
| 2011/0261872 A1* | 10/2011 | Wang et al. .......... 375/227 |
| 2012/0027115 A1* | 2/2012 | Grant et al. .......... 375/267 |
| 2012/0189083 A1 | 7/2012 | Reial |
| 2013/0077578 A1 | 3/2013 | Wang et al. |

FOREIGN PATENT DOCUMENTS

| | | |
|---|---|---|
| WO | 2010023100 A2 | 3/2010 |
| WO | 2012071724 A1 | 6/2012 |
| WO | 2012075387 A1 | 6/2012 |
| WO | 2013067130 A1 | 5/2013 |
| WO | 2014004897 A1 | 1/2014 |

OTHER PUBLICATIONS

Unknown, Author, "Discussion on the Definition of CQI in CoMP", 3GPP TSG RAN WG1 #68, R1-120170, Samsung, Dresden, Germany, Feb. 6-10, 2012, pp. 1-2.

Unknown, Author, "Study on Network-Assisted Interference Cancellation and Suppression for LTE", 3GPP TSG RAN Meeting #59, RP-130404, Vienna, Austria, Feb. 26-Mar. 1, 2013, pp. 1-7.

* cited by examiner

METHOD AND APPARATUS FOR SIGNAL QUALITY REPORTING FOR INTERFERENCE-CANCELLATION RECEIVERS

TECHNICAL FIELD

The present disclosure generally relates to wireless communication networks, and particularly relates to signal quality determination and reporting by interference-canceling receivers operating in such networks.

BACKGROUND

In modern wireless cellular systems, for example in High Speed Packet Access or HSPA, fast Link Adaptation (LA) is used in the downlink (DL) to control the data transmission rate between the transmitter and the receiver. For example, the receiver is a User Equipment or "UE" in the parlance used by the Third Generation Partnership Project (3GPP), and the transmitter is a network base station (BS), such as a "NodeB" in Wideband CDMA (WCDMA) networks or "eNodeB" in Long Term Evolution (LTE) networks.

The UE estimates the received signal quality of its serving cell signal during the current Transmit Time Interval (TTI) and reports the signal quality to the serving BS via a Channel Quality Indicator (CQI) report. For example, the UE estimates the signal-to-noise-plus-interference ratio (SINR) of the received serving cell signal, maps the SINR to a CQI value, and reports the CQI value to the serving BS.

The serving BS performs LA with respect to the UE based on the CQI values reported by the UE. LA examples include the BS using the CQI reports from the UE to schedule proper modulation and transport formats for transmitting to the UE in a future TTI. Here, "proper" denotes a modulation and coding scheme (MCS) that results in the UE decoding received transport blocks with a desired probability of success, e.g., with a BLock Error Rate (BLER) of ten percent or less. Thus, the BS adjusts the MCS used for transmitting to the UE in a future TTI based on the CQI reported by the UE for the current or past TTIs. Of course, this approach to LA assumes that reception conditions at the UE in the future TTI will be the same or similar to the reception conditions on which the CQI report is based.

The assumption holds for scenarios where the received signal quality at the UE is relatively constant relative to LA delay—i.e., the scheduling delay between the time the UE reports CQI and the data transmission to the UE that is based on the reported CQI. In HSPA, for example, such delays are typically around 3 TTIs or 6 milliseconds. That amount of time is of little consequence when reception conditions generally do not change rapidly, such as is the case for linear receivers when they are used at low-to-medium vehicular speeds in a relatively stable interference environment. The interference environment within a cellular communication network is stable, for example, when loading (activity) is constant within the cells neighboring a given serving cell. Traditional CQI reporting works well for stable interference environments, leading to near-optimal scheduling of UEs in such environments.

Conversely, in other scenarios, the demodulated signal quality experienced by a given UE varies significantly from one TTI to another. Consider advanced UE receiver architectures that perform other-cell interference cancellation (IC). Receivers of that type perform regeneration of interfering signals and use the regenerated signals to remove corresponding interference from the received signal and thereby improve the effective, post-IC SINR of the received signal.

Some IC receivers apply "soft" IC that can remove a fraction of the interfering signal energy even when the signal cannot be successfully decoded. The removable fraction of interference or "cancellation efficiency" (CE) depends on the reception quality of the interfering signal at the victim UE and on its MCS. Unfortunately, in real-world network deployments, the users served in any given cell may have widely disparate channel qualities with corresponding variations in the MCSs used to serve those users. Thus, the CE achievable via IC processing at an interfered, victim UE in a neighboring cell varies unpredictably with respect to the interfering transmissions to neighbor-cell users. Consequently, practical CQI reporting and corresponding LA approaches do not attempt to account for the instantaneous IC gains at UEs that have IC receivers. Instead, it is known to account for the effects of IC at UEs by applying an offset to measured or reported SINR (or CQI).

For example, certain BS scheduler implementations include a CQI offset "outer loop" where a UE-specific SINR offset is applied to the SINR info extracted from the received CQI reports from that UE. The offset accounts for the fact that the CQI values reported by a UE may include a systematic bias error and do not necessarily lead to the target BLER. The offset is designed to shift the actual SINR-to-MCS mapping in scheduling so as to make the actual first transmission BLER equal to the target BLER value. In a similar approach, the CQI outer loop is not implemented at the BS and instead is emulated on the UE side, based on the UE observing first-transmission BLER and adjusting reported signal quality by an offset that drives the long-term BLER to the desired value.

The use of such SINR offsets addresses the problem of varying CE at an IC UE in the sense that the offset is fixed or slowly changing and corresponds to an average efficiency or some other relatively conservative estimate of CE at the UE. However, while this conservative approach generally avoids the selection of MCS values that are too aggressive with respect to the actual CE realizable at the UE in the instantaneous sense, it is recognized herein that this approach fails to exploit instances of higher CE at the UE. That failure results in lower than achievable throughput to the UE.

SUMMARY

In one aspect, the teachings herein disclose a method and apparatus for signal quality reporting from a wireless apparatus that better reflects the actual interference cancellation efficiency expected at the wireless apparatus for a given transmission interval. In one example, the wireless apparatus knows or predicts the particular modulation and coding schemes (MCSs) that will be used in the transmission of one or more interferer signals for a transmission interval of interest. In turn, it uses those MCS values to estimate the actual interference cancellation efficiency the wireless apparatus will achieve with respect to those interferers. The wireless apparatus estimates and reports signal quality according to its estimated interference cancellation efficiency. Such processing allows the supporting wireless communication network to improve throughput by more aggressively scheduling the wireless apparatus for transmission intervals during which the wireless apparatus exhibits higher interference cancellation efficiency.

In an example embodiment, a wireless apparatus is configured for operation in a wireless communication network and implements a method of signal quality reporting. The method includes receiving a signal from the wireless communication network that includes a desired signal and one or more interferer signals, and estimating an impairment covariance of the desired signal. Further, for each interferer signal, the method includes estimating a signal quality of the interferer signal, determining an MCS of the interferer signal, and estimating a cancellation efficiency of the wireless apparatus with respect to the interferer signal, based on the signal quality and MCS of the interferer signal.

The method further includes for each interferer signal calculating an impairment covariance correction term corresponding to the interferer signal. The calculation is performed by computing the signal covariance of the interferer signal and scaling the signal covariance according to the cancellation efficiency estimated for the wireless apparatus with respect to the interferer signal. Still further, the method includes obtaining a compensated impairment covariance for the desired signal by subtracting each impairment covariance correction term from the impairment covariance, estimating a signal quality of the desired signal as a function of the compensated impairment covariance, and reporting the signal quality of the desired signal to the wireless communication network.

In another embodiment, a wireless apparatus configured for operation in a wireless communication network includes a receiver front-end circuit that is configured to receive a signal from the wireless communication network. The received signal includes a desired signal and one or more interferer signals. Correspondingly, the wireless apparatus further includes a receiver processing circuit that is operatively associated with the receiver front-end circuit and configured to estimate an impairment covariance of the desired signal. The receiver processing circuit is further configured to perform a number of processing operations with respect to each interferer signal.

In this regard, for each interferer signal, the receiving processing circuit is configured to estimate a signal quality of the interferer signal, determine an MCS of the interferer signal, estimate a cancellation efficiency of the wireless apparatus with respect to the interferer signal, based on the signal quality and the MCS of the interferer signal, and calculate an impairment covariance correction term corresponding to the interferer signal. The receiver processing circuit calculates the correction term by computing the signal covariance of the interferer signal and scaling it according to the cancellation efficiency estimated for the wireless apparatus with respect to the interferer signal.

The receiver processing circuit is further configured to obtain a compensated impairment covariance for the desired signal by subtracting each impairment covariance correction term from the impairment covariance, estimating a signal quality of the desired signal as a function of the compensated impairment covariance and reporting the signal quality of the desired signal to the wireless communication network.

In yet another embodiment, a computer-readable medium stores a computer program comprising computer program instructions that when executed by a receiver processing circuit in a wireless apparatus configures the wireless apparatus estimate and report signal quality as taught herein. That is, the contemplated computer program comprises program instructions which, when executed by the wireless apparatus, configure the wireless apparatus to perform the above-described method.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
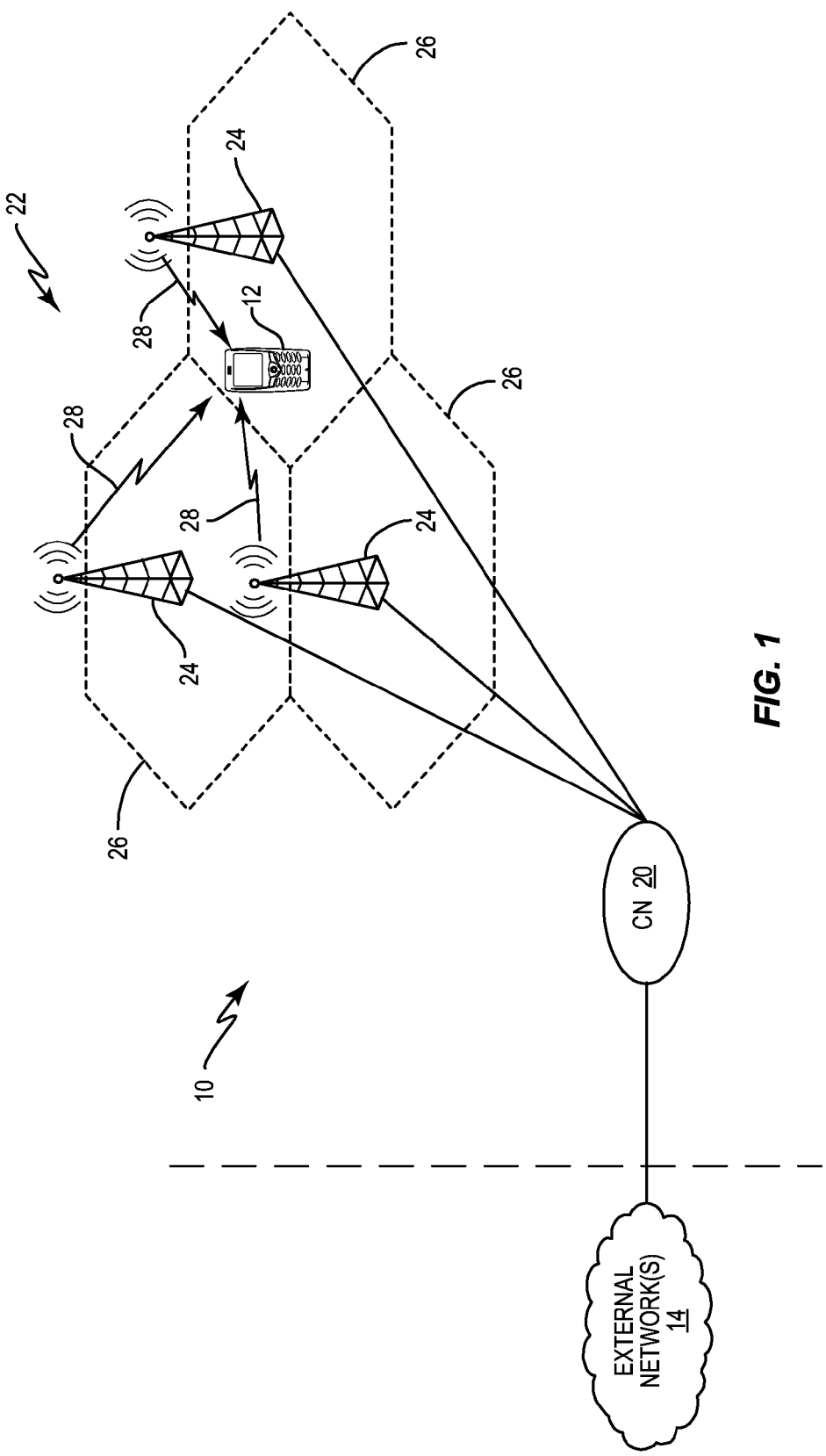
FIG. 1 is a block diagram of one embodiment of a wireless communication network and an associated wireless apparatus configured for operation within the network.

FIG. 1 illustrates an example wireless communication network 10 ("network 10"), which provides one or more communication services to one or more wireless apparatuses 12, where only one is shown for convenience. The network 10 communicatively couples the wireless apparatuses 12 to other devices or systems reachable through one or more external communication networks 14, such as the Internet. In a non-limiting example, the network 10 comprises a Wideband Code Division Multiple Access (WCDMA) network that provides High Speed Packet Access (HSPA) services, or comprises a Long Term Evolution (LTE) network. In such embodiments, the wireless apparatuses 12 comprise User Equipments or UEs. Broadly, the wireless apparatuses 12 may comprise smartphones or other types of mobile terminals, laptops, tablets, or essentially any other device configured for wireless operation within the network 10.

For purposes of discussion, the network 10 includes a simplified Core Network (CN) 20 and a simplified Radio Access Network (RAN) 22. The RAN 22 includes a number of base stations 24, each providing service in one or more cells 26. The serving base station 24 for a given cell transmits downlink signals 28, which include broadcast and common channels, control channels and data channels. The illustrated arrangement of cells 26 is non-limiting and the teachings herein apply to homogeneous networks comprising arrangements of macro or large-area cells and to heterogeneous networks comprising a mix of macro and micro cells, such as where one or more hotspots overlay the macro cell coverage area.

In an example scenario, a given one of the base stations 24 operates as a serving base station 24 for the illustrated wireless apparatus 12 and the downlink signal 28 (or at least certain components or channels therein) from the serving base station 24 may be regarded as a "desired" signal for the wireless apparatus 12. However, wireless apparatus 12 also receives downlink signals 28 from one or more of the neighboring base stations 24, which are interferer signals with respect to demodulation and decoding of the desired signal at the wireless apparatus 12. In general, the wireless apparatus 12 may be regarded as receiving a signal wherein the received signal includes a desired signal and one or more interfering signals, e.g., other-cell interferers.

The position of the wireless apparatus 12 relative to the serving and interfering base stations 24, its speed, and the particular users (other wireless apparatuses, not shown in FIG. 1) being served by the interfering base stations 24 all affect the interference seen by the wireless apparatus 12. The wireless apparatus 12 includes an interference-canceling (IC) receiver (not shown in FIG. 1) and the cancellation efficiency (CE) of the receiver—i.e., the extent that its IC processing removes interference from the received signal—depends on a number of factors, including the signal strength/quality of the interferer signals and the modulation and coding schemes (MCSs) used to transmit them.

Figure 2:
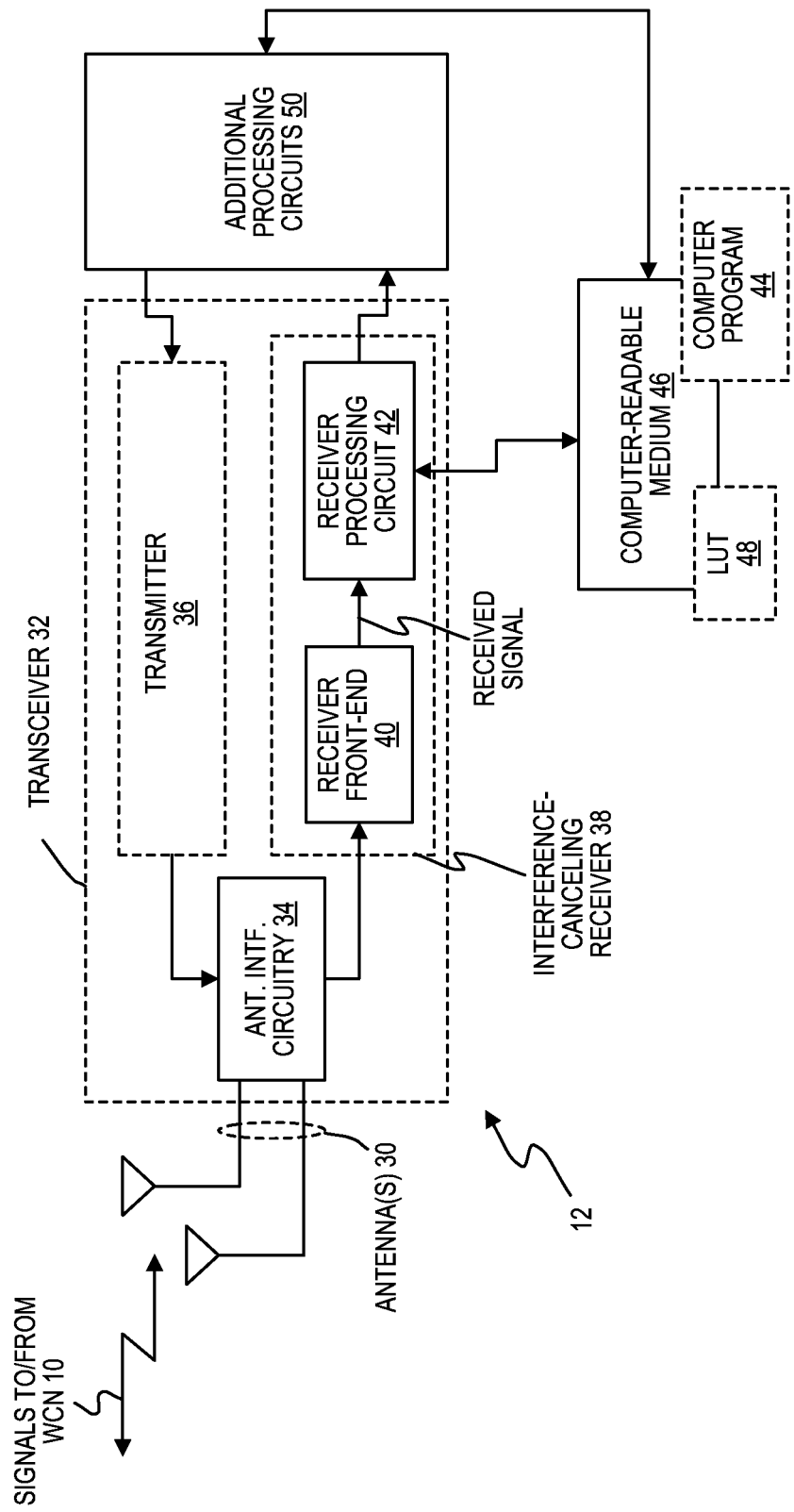
FIG. 2 is a block diagram of one embodiment of the wireless apparatus introduced in FIG. 1.

FIG. 2 illustrates example details for the wireless apparatus 12, wherein the wireless apparatus 12 is configured for operation in the network 10 and is further configured for improved signal quality estimation and reporting, according to the teachings herein. That is, in one or more configuration examples, the wireless apparatus 12 determines the particular modulation and coding schemes (MCSs) that will be used in the transmission of one or more interferer signals for a transmission interval of interest, e.g., a forthcoming Transmission Time Interval or TTI. The wireless apparatus 12 uses the determined MCS value(s) to estimate the CE the wireless apparatus 12 will actually achieve with respect to the interferer signal(s) and estimates and reports signal quality according to its estimated CE. Thus, in at least one example embodiment, the wireless apparatus 12 can be understood as dynamically predicting the CE it expects to achieve in a future transmission interval with respect to each of one or more interferer signals to be canceled, based on assuming that current channel conditions estimated for each interferer signal will be applicable to the future transmission interval, and based on assuming that the MCS of each interferer signal in the future transmission interval can be known or predicted within reasonable accuracy from prior MCS values of the interferer signals.

As such, the wireless apparatus 12 will be understood as reporting signal quality for a given transmission interval in dependence on estimates of the actual CE that the wireless apparatus 12 expects to achieve with respect to one or more interferer signals. That is, the wireless apparatus 12 does not assume some average or discounted CE, which may underestimate the actual IC performance the wireless apparatus 12 can achieve for particular types of interference and/or for particular reception conditions. Instead, for each of one or more interferer signals within the received signal, the wireless apparatus 12 determines the MCS value of the interferer signal for the transmission interval of interest and estimates the signal quality of the interferer signal, and uses those parameters to map to or otherwise obtain the actual CE expected for the wireless apparatus 12 with respect to the interferer signal. It will be understood that CE denotes the specific fraction of interferer signal energy removed from the received signal via IC processing, while the IC performance depends on CE but more generally denotes the SINR or throughput gains achieved via IC processing at the wireless apparatus 12.

Such operations reflect the fact that the interference cancellation performance of the wireless apparatus 12 varies in dependence on the MCS of the interferer signals—interference cancellation is better for lower coding rates or lower modulation formats—and varies in dependence on the signal quality of the interferer signals—e.g., soft symbol regeneration for subtraction of interfering symbols from the received signal works better with higher interferer signal quality. In some embodiments, the wireless apparatus 12 knows the MCS values in use for the interfering signals, e.g., based on receiving information from the network 10 (e.g., assistance information regarding neighboring cell transmissions). Additionally, or alternatively, the wireless apparatus 12 predicts or otherwise forecasts the MCS values that will be in use for the interferer signals for an upcoming transmission interval of interest.

For example, in a given TTI the wireless apparatus 12 sends a Channel Quality Indicator (CQI) to its serving base station 24, which the serving base station 24 uses to perform LA with respect to the wireless apparatus 12 in a next or forthcoming TTI. The wireless apparatus 12 in one or more embodiments observes the MCSs that have been used for given interferer signals—e.g., given other-cell downlink signals—and bases its determination of the MCSs that will or are most likely to be in use for those interferer signals in a next or forthcoming TTI based on its observation of past MCSs. Such processing allows the supporting wireless communication network to improve throughput by more aggressively scheduling the wireless apparatus 12 for transmission intervals during which the wireless apparatus 12 exhibits higher interference cancellation efficiency.

More "aggressive" scheduling can be understood as scheduling that exploits the more accurate and dynamic estimates of the actual CE expected for the wireless apparatus 12 in given scheduling intervals, e.g., in given TTIs. More aggressive scheduling in one example means scheduling higher code rates and/or modulation formats—resulting in higher throughput to the wireless apparatus 12—than would be used if the wireless apparatus 12 were being scheduled according to non-IC operation, or according to some baseline or average CE of IC at the wireless apparatus 12. Put another way, by virtue of the wireless apparatus 12 dynamically estimating the actual CE expected for given scheduling intervals as a function of actual channel conditions and changing determinations of interferer signal MCS, the CQIs reported by the wireless apparatus 12 are on average higher than the CQIs that would be reported if the wireless apparatus 12 simply assumed some fixed or long-term average CE. In turn, the higher average CQI drives the network 10 to use MCSs having higher data rates.

Turning to the example details in FIG. 2, the wireless apparatus 12 is shown as receiving signals from and transmitting signals to the wireless communication network 10, abbreviated as "WCN 10" in the illustration. To support such functionality, the wireless apparatus 12 includes one or more antennas 30 and a transceiver 32 that includes antenna interface circuitry 34, a transmitter 36 and a linear, interference-canceling receiver 38, which is simply referred to hereafter as the "receiver 38." In some embodiments at least, the transceiver 32 comprises a "cellular modem" or other such communication circuit or module that is configured to support wireless communications with the network 10—e.g., air interface formats, protocols, authentication procedures, including all control and data signaling. The transmitter 36 and the receiver 38 will be understood to include analog and digital circuitry, for transmitting and receiving signals via the antenna(s) 30.

Of particular interest for this disclosure, the receiver 38 includes a receiver front-end 40 and a receiver processing circuit 42. The receiver front-end 40 operates on antenna-received signals and provides the receiver processing circuit 42 with one or more digitized sample streams corresponding to the antenna-received signals. For example, the receiver front-end 40 generates digital sample streams corresponding to antenna-received signals, based on filtering, amplifying, down converting, and digitizing the antenna-received signals. The resulting digitized baseband signal(s) feed into the receiver processing circuit 42, which comprises fixed circuitry or programmed circuitry, or some combination thereof. In at least one embodiment, the receiver processing circuit 42 comprises one or more Digital Signal Processors (DSPs), microprocessors, Application Specific Integrated Circuits (ASICs), Field Programmable Gate Arrays (FPGAs), or other digital processing circuits, which are configured to perform signal quality estimation and reporting according to the teachings herein.

In at least one such embodiment, the receiver processing circuit 42 is so configured based on its execution of program instructions comprising a computer program 44 that is stored in a computer-readable medium 46. While the illustration suggests that the computer-readable medium 46 is separate from the receiver processing circuit 42, it may be integrated within the receiver processing circuit 42, and the computer-readable medium 46 in at least some embodiments actually comprises more than one type of memory or storage circuit or device.

For example, the computer-readable medium 46 includes non-volatile memory for storing the computer program 44 and/or configuration data, such as one or more Look-Up Tables (LUTs) 48, which are used in one or more embodiments herein to "map" MCS and/or signal quality values to corresponding estimates of actual interference cancellation efficiency by the receiver 38. Non-volatile memory may comprise FLASH, EEPROM, etc. The computer-readable medium 46 may further comprise volatile memory, e.g., SRAM, for use as working memory for signal processing, signal sample buffering, etc., during live operation of the wireless apparatus 12.

The example wireless apparatus may also include one or more additional processing circuits 50, such as application processors, user interface circuits, near-field communication interfaces, etc., in dependence on the intended use and features of the wireless apparatus 12. Such additional processing circuits 50 may share the computer-readable medium 46 and/or may include further memory/storage circuitry for supporting their operation. Such details are not germane to the signal quality estimation and reporting taught herein, and these example implementations of the functional and physical processing circuitry of the wireless apparatus 12 will be understood as non-limiting.

The receiver processing circuit 42 in one or more embodiments comprises a linear front end, e.g., a Generalized RAKE (G-RAKE) receiver, which performs received signal equalization with respect to the received signal output from the receiver front-end 40. See U.S. Pat. Nos. 6,922,434, 8,218,606, 8,224,278 and 8,254,325 for example details regarding G-RAKE receiver design and operation. Of course, the G-RAKE implementation is a non-limiting example of the initial linear processing applied within the front end of the receiver processing chain implemented in the receiver processing circuit 42. Such an implementation can be used advantageously where the wireless apparatus 12 is configured for operation within WCDMA/HSPA networks, while alternative arrangements may be used in LTE or other contexts. Broadly, the linear receiver part may in principle be any linear combining receiver type known in the art, such as parametric/non-parametric GRAKE, or RAKE, or chip equalizer in WCDMA/HS contexts, or in LTE contexts, essentially any MRC/IRC (Maximum Ratio Combining/Interference Rejection Combining) receiver type using essentially any parameter estimation type.

Regardless of its implementation details, the linear processing front end in the receiver processing circuit 42 is followed by IC processing circuitry, which performs IC for one or more interferer signals. In one non-limiting example, IC processing includes estimating interfering symbols conveyed in one or more interferer signals, regenerating channel-convolved versions of those interfering symbol estimates and subtracting the regenerated symbols from the received signal. Of course, the particular IC processing performed may vary. For example, IC processing in the LTE signal context involves symbol level subtraction, but symbol level subtraction is usually not used in the WCDMA signal context.

In any case, IC processing improves the signal-to-noise-plus-interference ratio (SINR) with respect to desired symbols conveyed by the desired signal(s) within the received signal. For example non-limiting details, one may refer to U.S. Pat. No. 8,340,202, which details an applicable approach to soft modulation for interference cancellation. However, the teachings herein are not limited to a particular implementation of IC processing. Rather, the teachings herein advantageously recognize that the CE of an IC receiver is channel-dependent with respect to the interferer signal being canceled. This dependency, which may be considered in further view of the CE dependency on interferer signal MCS, may be characterized and the characterization is used herein to more accurately and more dynamically estimate the expected CE of the receiver 38 for a given interferer signal in a given transmission interval.

In this regard, it will be understood that an antenna-received signal at the wireless apparatus 12 generally will be a composite of one or more desired signals and one or more interferer signals. This idea may be extended to the case where the received signal includes multiple desired signals that interfere with each other. In any case, demodulation and decoding of the signal that is considered as the desired signal for given demodulation and decoding processing is improved by canceling one or more interferer signals that impair processing of the desired signal. The desired signal(s) may also be referred to as desired signal component(s), and the interferer signal(s) may be referred to as interferer signal component(s). Further, it should be noted that when the receiver 38 is described herein as performing interference cancellation with respect to "one or more interferer signals," it should be understood that such processing may be limited to a fixed number of interferers, e.g., one, two, or a limited number of the most dominant and/or most harmful interferers. That is, the receiver 38 should not be understood as necessarily attempting to detect and/or cancel any and all interfering components in the received signal.

Further, the nature of the receiver 38 is subject to variation in dependence on the signal type(s) it is intended to transmit and receive. In an LTE example, the receiver 38 may be configured to work with parallel signal processing paths, with each path corresponding to signal reception on a different one of the antennas 30. In a Direct Sequence (DS) spread spectrum example, e.g., for operation in a WCDMA network with HSPA, the receiver 38 includes multiple parallel receiver processing paths corresponding to different antenna and multipath delay combinations.

Figure 3:
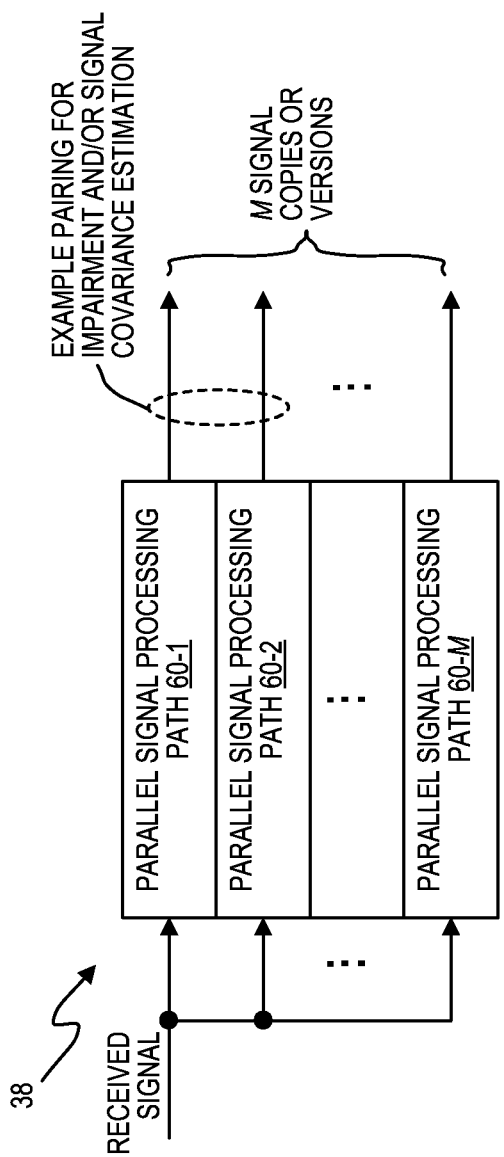
FIG. 3 is a block diagram illustrating example parallel processing paths within a linear front end of an interference-canceling receiver in the wireless apparatus of FIG. 2.

FIG. 3 generically illustrates such parallel received signal paths, by showing a number of parallel signal processing paths 60, e.g., 60-1, 60-2, . . . , 60-M, where M is an integer number. Based on having multiple versions or copies of the received signal across these parallel paths, the receiver 38 performs a number of covariance processing operations according to the teachings herein. The term "covariance" of course encompasses the term "correlation" but allows for non-zero mean. Broadly, "covariance" denotes the expected value of the product of the deviations of two random variables from their respective means, or the arithmetic mean of the products of the deviations of corresponding values of two quantitative variables from their respective means.

Thus, as will be detailed below, the receiver 38 performs improved signal quality estimation and reporting for a desired signal, based in part on estimating an "impairment covariance" of the desired signal. Here, "impairments" are distortions in the desired signal caused by noise and interference. To determine the impairment covariance of the desired signal, the receiver 38 estimates the extent to which the impairment seen with respect to the desired signal in each one of the parallel signal processing path 60 correlates with the impairment seen in each of the other ones of the parallel signal processing paths 60. The results of such processing may be represented in an impairment covariance matrix whose elements reflect the covariance of impairment between respective pairs of the parallel signal processing paths 60, for the desired signal.

In similar fashion, the receiver 38 also determines a "signal covariance" for each interferer signal of interest. In this case, the receiver 38 determines the covariance observed for each desired signal across respective pairings of the parallel signal processing paths 60. The resulting determinations may be represented in a signal covariance matrix whose elements reflect the covariance between the different copies/versions of the interfering signal, as seen across respective pairings of the parallel processing paths 60.

Figure 4:
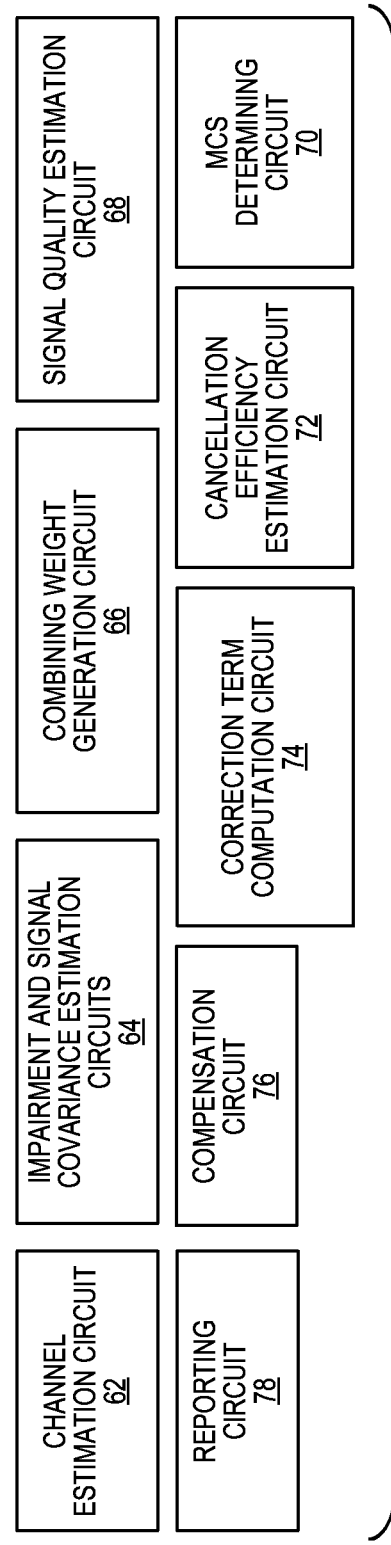
FIG. 4 is a block diagram illustrating one embodiment of a functional or physical circuit arrangement for the wireless apparatus of FIG. 2.

FIG. 4 illustrates an example arrangement of functional and/or physical processing circuits implemented within the receiver processing circuit 42, for performing the above impairment and signal covariance processing, and for performing the overall signal quality estimation and reporting processing contemplated herein. The illustrated circuitry includes a channel estimation circuit 62, an impairment and signal covariance estimation circuit 64, a combining weight generation circuit 66, a signal quality estimation circuit 68, an MCS determining circuit 70, a cancellation efficiency estimation circuit 72, a correction term computation circuit 74, a (signal quality) compensation circuit 76, and a (signal quality) reporting circuit 78.

Before delving into the operational details of such circuitry, the channel estimation circuit 62 performs channel estimation with respect to desired and interfering signals. The impairment and signal covariance estimation circuits 64 perform impairment covariance estimation with respect to the desired signal, and signal covariance estimation with respect to the interferer signal(s) of interest. The combining weight generation circuit 66 computes combining weights for the desired signal, and for each interfering signal, e.g., G-RAKE combining weights for combining the parallel signal copies/versions across the parallel signal processing paths 60. The signal quality estimation circuit 68 estimates the signal quality for each interferer signal being processed, and is further configured to estimate the signal quality of the desired signal after compensation processing by the compensation circuit 76.

The MCS determining circuit 70 determines the MCS of each interferer signal, e.g., it makes a prediction or assumption of what the MCS will be for the interferer signal at a time relevant to the estimation of desired signal quality. The cancellation efficiency estimation circuit 72 uses the estimated signal quality and determined MCS of each interferer signal to estimate the CE that the wireless apparatus 12 is expected to achieve with respect to the interferer signal. Correspondingly, the correction term computation circuit 74 uses the estimated CEs to compute correction terms that are used by the compensation circuit 76 to revise the initial impairment covariance estimated for the desired signal, so that it reflects the expected CEs of the wireless apparatus 12 with respect to those impairments arising from respective ones of the interferer signals. In turn, the signal quality estimation circuit 68 uses the compensated impairment covariance to estimate signal quality for the desired signal, thus representing the actual IC performance expected for the wireless apparatus 12 with respect to the interferer signals, and the reporting circuit 78 reports this more accurate and thus improved estimate of signal quality for the desired signal to the network 10.

Figure 5:
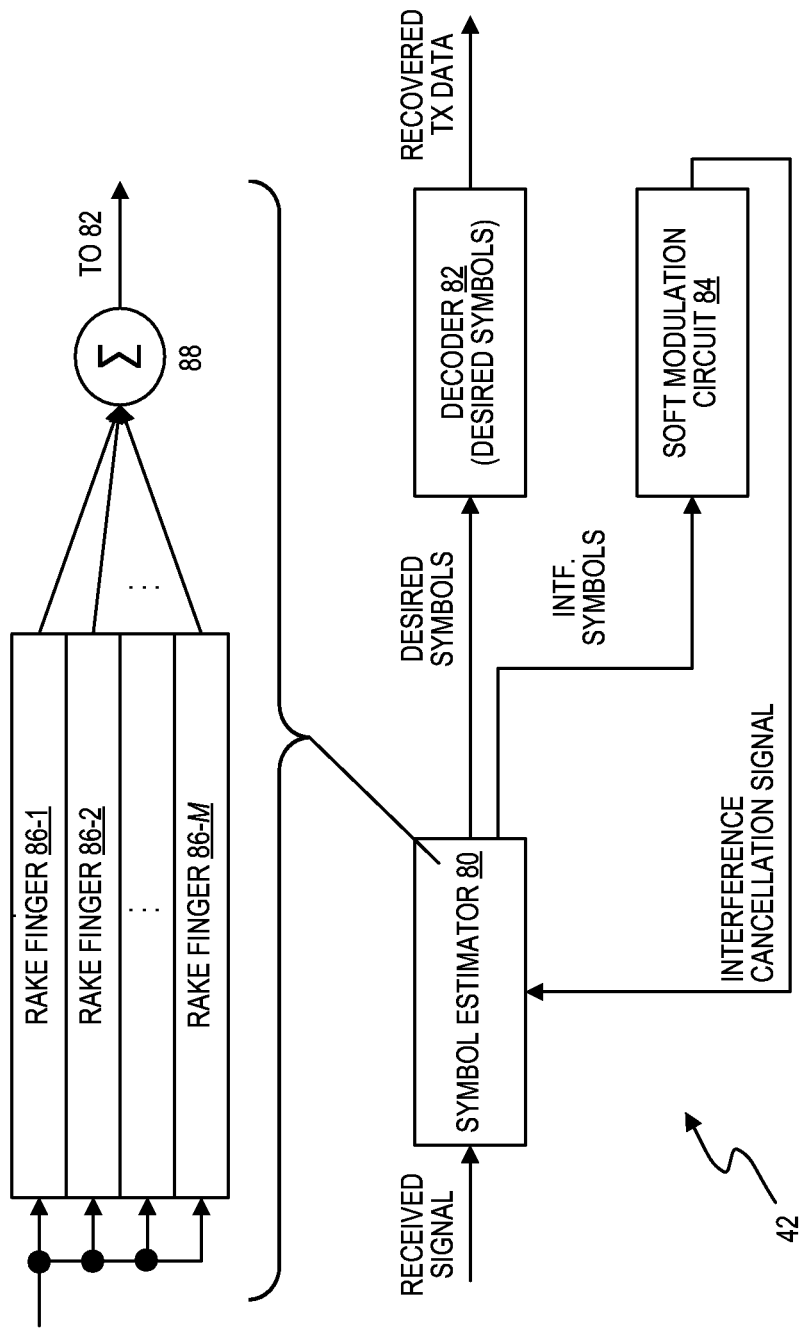
FIG. 5 is a block diagram illustrating a Generalized RAKE (G-RAKE) configuration of the linear front end as an example implementation for the receiver introduced in FIG. 3.

FIG. 5 illustrates a simplified example implementation of the receiver processing circuit 42 as including a symbol estimator 80, which estimates desired and interfering symbols conveyed in desired and interferer signals within the composite received signal. The example implementation further includes a decoder 82, which at least decodes the desired symbols to recover transmitted data (traffic and/or control signaling from the network 10 to the wireless apparatus 12). The receiver processing circuit 42 further includes a soft modulation circuit 84, which produces an interference cancellation signal, e.g., comprising regenerated (channel-convolved) versions of the interfering symbols, for subtraction from the received signal at the symbol estimator 80.

The symbol estimator 80, which serves as a non-limiting example of the aforementioned linear processing front end implemented by the receiver processing circuit 42, may be implemented as a G-RAKE receiver. In such an example, multiple RAKE fingers 86-1 through 86-M correspond to the parallel signal processing paths 60 discussed earlier herein, and feed into a combining circuit 88 that provides a RAKE-combined signal to the decoder 82 for decoding the desired symbols. In other embodiments, the symbol estimator 80 may be an IRC stage in an LTE receiver where the multiple receiver antenna outputs correspond to the parallel signal processing paths 60.

In a generalized example case, the received signal may be viewed as comprising a set of initial symbol estimates after some preliminary processing (e.g., via initial processing in the receiver front-end 40, possibly with further initial processing in the receiver processing circuit 42). In an example case for WCDMA, the front-end processing includes RF signal reception, sampling, despreading and initial symbol estimation, where the symbol estimates span antennas and delays. In an example case for LTE, the front-end processing includes RF signal reception, sampling and Fast Fourier Transformation (FFT) and the initial symbol estimates span only antennas.

With these examples in mind, it will be appreciated that the wireless apparatus 12 is configured for operation in the network 10 and will vary in its implementation in dependence on the air interface and other particulars used in the network 10. Broadly, however, the wireless apparatus 10 includes a receiver 38 comprising a receiver front-end circuit 40 that is configured to receive a signal from the network 10, where the received signal includes a desired signal and one or more interfering signals, and further includes a receiver processing circuit 42 that is operatively associated with the receiver front-end circuit 40 and is configured to perform improved signal quality estimation and reporting for the desired signal, as taught herein.

In particular, the receiver processing circuit 42 is configured to estimate an impairment covariance of the desired signal and, for each interferer signal: estimate a signal quality of the interferer signal; determine an MCS of the interferer signal; estimate a cancellation efficiency of the wireless apparatus 12 with respect to the interferer signal, based on the signal quality and MCS of the interferer signal; and calculate an impairment covariance correction term corresponding to the interferer signal, based on computing the signal covariance of the interferer signal and scaling the covariance according to the cancellation efficiency.

Thus, the receiver processing circuit 42 obtains an impairment covariance correction term for each interferer signal being processed (which may be fewer than all interferer signals present in the receive signal), and is further configured to obtain a compensated impairment covariance for the desired signal by subtracting each impairment covariance correction term from the impairment covariance. This process can be understood as removing an amount of impairment from the desired signal corresponding to each interferer signal that reflects the actual cancellation efficiency expected for the wireless apparatus 12 with respect to the interferer signal, in dependence on the signal quality estimated for the interferer signal and the MCS determined for the interferer signal.

Correspondingly, the receiver processing circuit 42 is configured to estimate signal quality for the desired signal as a function of the compensated impairment covariance, and to report the signal quality of the desired signal to the wireless communication network. As a consequence, the signal quality reported for the desired signal in general better reflects the actual interference cancellation efficiency that will be achieved by the wireless apparatus 12 with respect to the interferer signals. Such operation stands in sharp contrast, for example, with an approach that relies on some discounted or average cancellation efficiency known for the wireless apparatus 12.

Figure 6A:
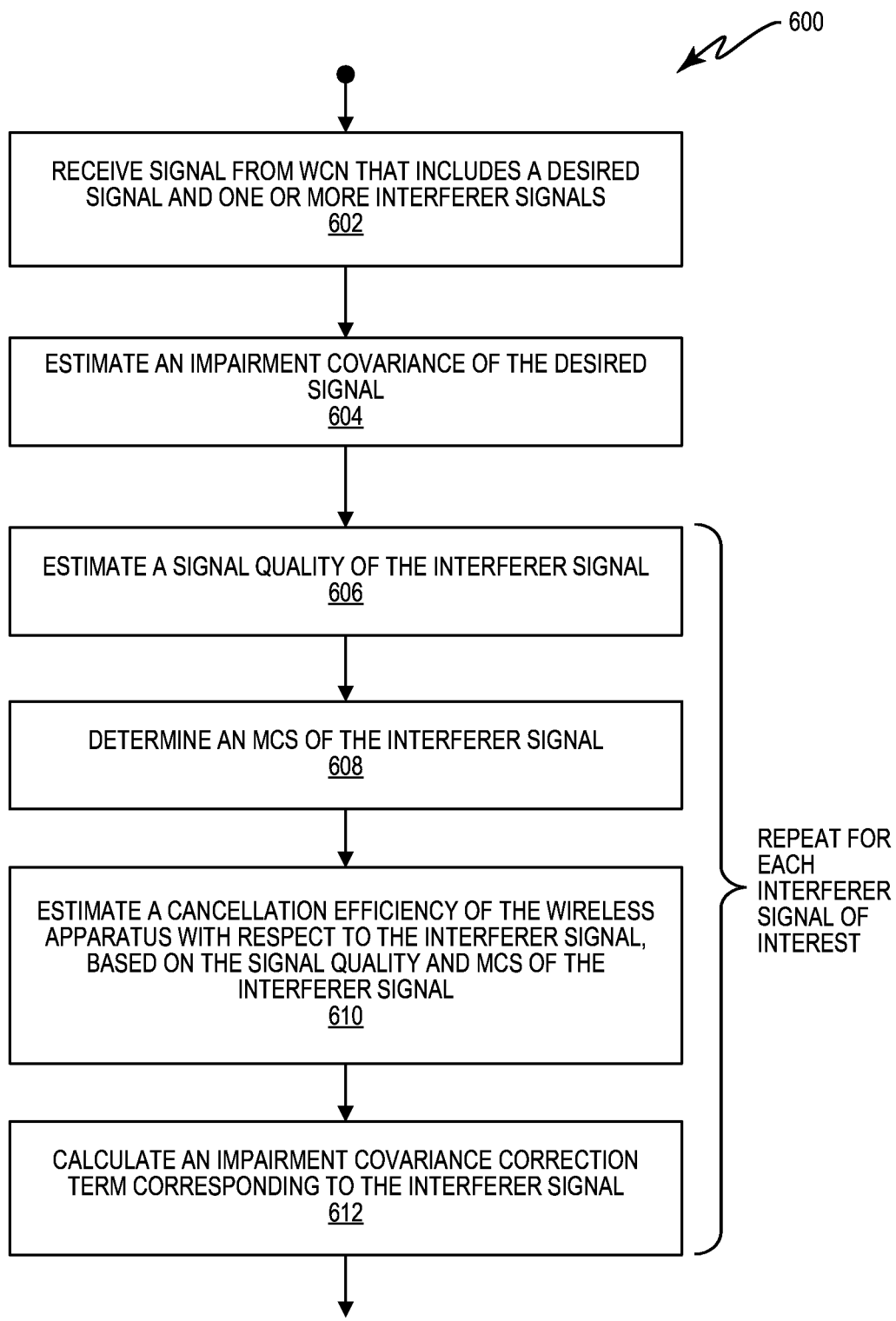
FIGS. 6A and 6B are logic flow diagrams of one embodiment of a method of signal quality determination and reporting, as may be performed by the wireless apparatus of FIG. 2.
Figure 6B:
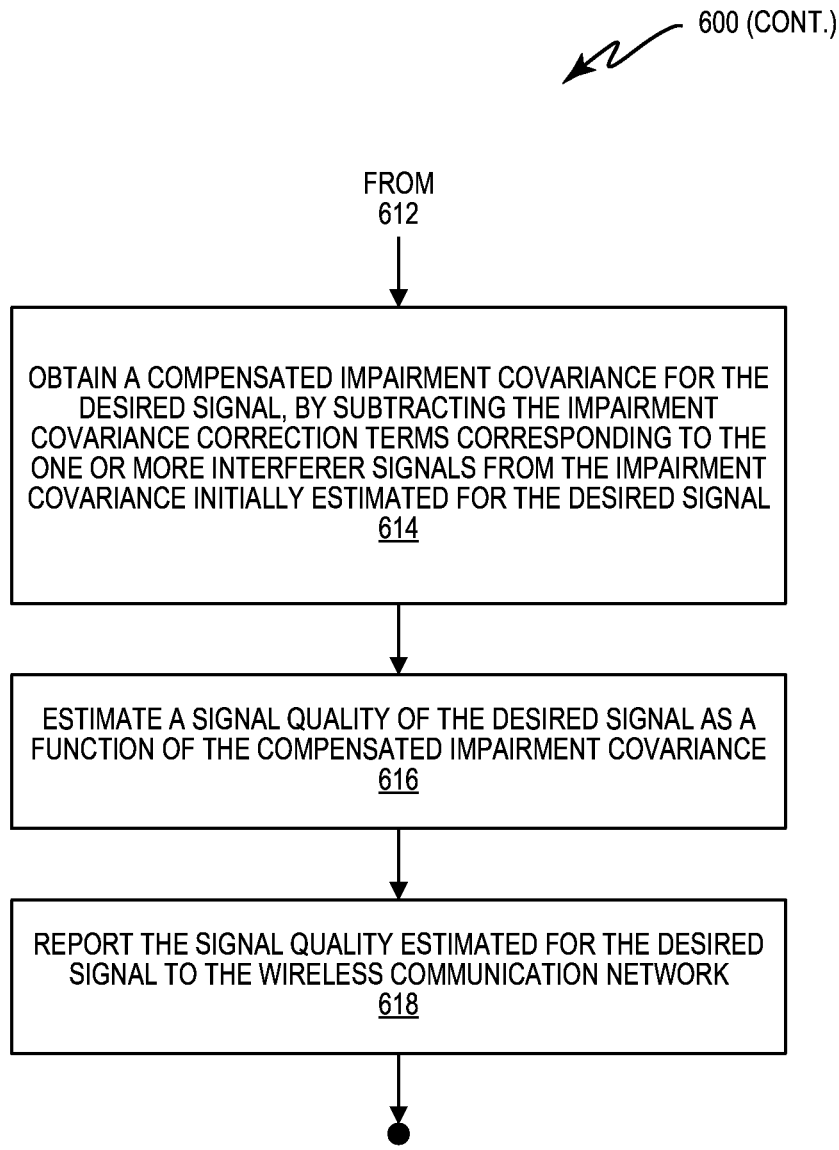
Figure 7:
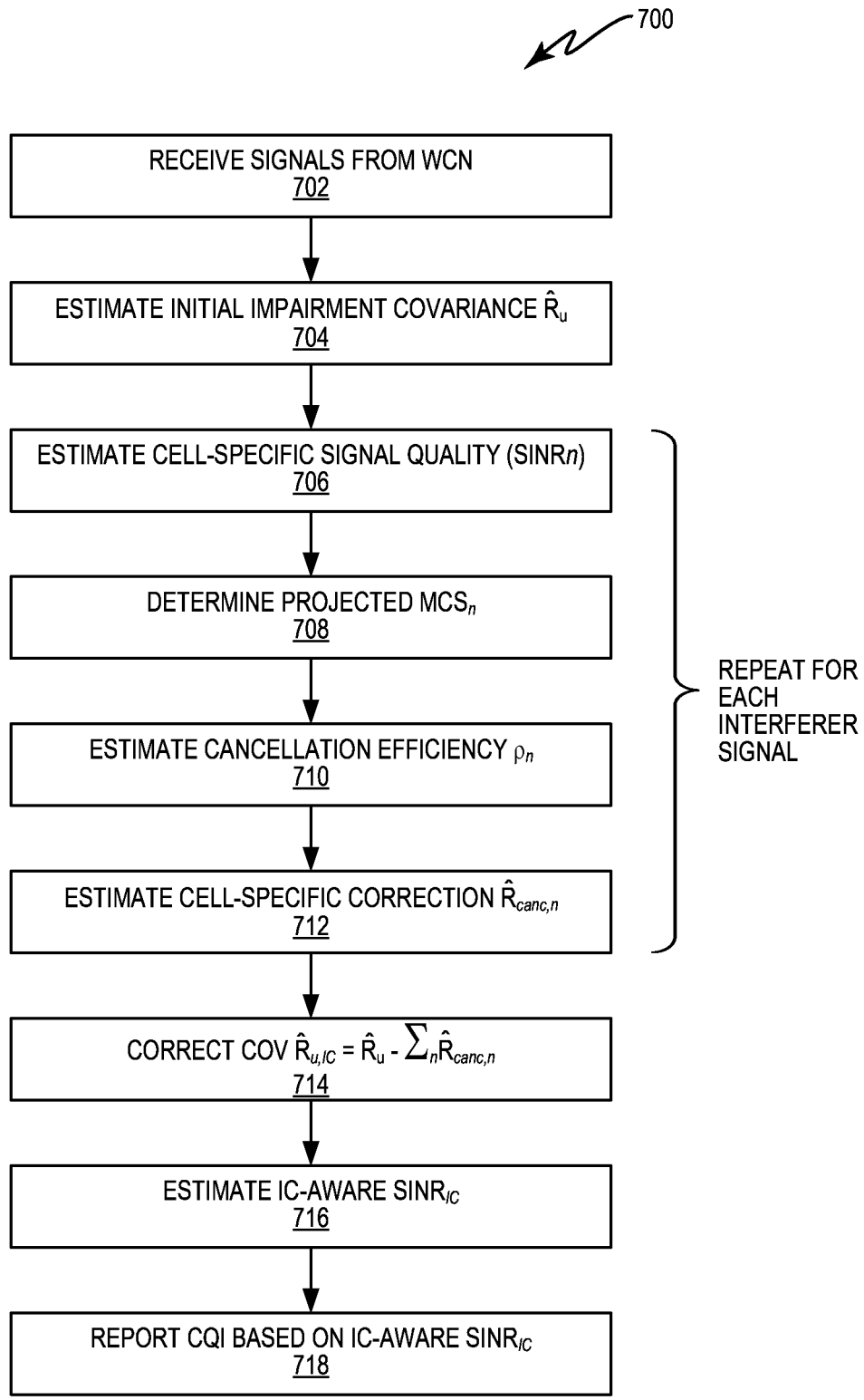
FIG. 7 is a logic flow diagram of another embodiment of a method of signal quality determination and reporting, as may be performed by the wireless apparatus of FIG. 2.

Further, as noted above, such operation may be achieved via execution of a computer program 44 by the receiver processing circuit 42, where such program is stored in a computer-readable medium 46 that is in or accessible to the receiver processing circuit 42. In an example implementation, execution of the computer program 44 configures the receiver processing circuit 42 (and the wireless apparatus 12 at large) to perform the method 600 as shown in FIGS. 6A and 6B or the method 700 as shown in FIG. 7. In this regard, the method 700 may be regarded as a specific or more detailed example of the method 600, for the case where the interferer signals are other-cell interferers (i.e., interfering downlink signals 28 being transmitted in one or more cells 26 that are neighboring with respect to a serving cell 26 of the wireless apparatus 12).

For the more generalized presentation of FIGS. 6A and 6B, the method 600 includes receiving (Block 602) a signal from the network 10 that includes a desired signal and one or more interferer signals. Here, it will be understood that the "one or more interferer signals" may comprise a selected and/or dominant subset of a larger number of interferers present in the received signal—i.e., the method 600 should not be understood as necessarily processing every interferer signal that is present in the received signal.

The method 600 further includes estimating (Block 604) an impairment covariance of the desired signal and performing a number of operations for each interferer signal of interest. As for making the initial estimate of impairment covariance of the desired signal, the receiver 38 of the wireless apparatus 12 estimates an impairment covariance for the desired signal, and determines impairment covariance correction terms for each of the interferer signals being canceled.

As noted, in some embodiments, the receiver 38 includes multiple, parallel branches or paths 60, e.g., multi-antenna branches or G-RAKE fingers. In such embodiments, the impairment covariance of the desired signal may be represented as matrix of covariance terms, each expressing the covariance of desired signal impairment as seen across a respective pairing of the parallel paths 60. Similarly, the impairment covariance correction term determined for each interferer signal being processed may be represented as a signal covariance estimated for the interferer signal, as scaled by the CE expected for the interferer signal. The signal covariance for a given interferer signal in the parallel-path implementation of the receiver 38 may be represented as a covariance matrix, where each matrix element represents the interferer signal covariance between a respective pair of the parallel paths 60. However, the teachings herein also apply directly to single-path implementations of the receiver 38, which have only one received signal processing path 60. In such embodiments, the impairment and signal covariance matrices degenerate to scalar impairment and signal power values, respectively.

With the above understanding in mind, the method 600 includes, for each interferer signal of interest: estimating (Block 606) a signal quality of the interferer signal; determining (Block 608) a MCS of the interferer signal; estimating (Block 610) a cancellation efficiency of the wireless apparatus 12 with respect to the interferer signal, based on the signal quality and MCS of the interferer signal; and calculating (Block 612) an impairment covariance correction term corresponding to the interferer signal. The impairment covariance correction term for each interferer signal is calculated, for example, by computing the signal covariance of the interferer signal and scaling it according to the cancellation efficiency expected for the wireless apparatus 12 with respect to the interferer signal, which in turn depends on the signal quality estimated for the interferer signal and the MCS determined for the interferer signal.

As shown in FIG. 6B, the method 600 further includes obtaining (Block 614) a compensated impairment covariance for the desired signal by subtracting each impairment covariance correction term from the impairment covariance. Processing according to the method 600 continues with estimating (Block 616) a signal quality of the desired signal as a function of the compensated impairment covariance and reporting (Block 618) the signal quality of the desired signal to the wireless communication network 10. As such, the signal quality of the desired signal is estimated as a function of the actual cancellation efficiency expected for the wireless apparatus 12 with respect to the one or more interferer signals. In turn, the cancellation efficiencies are estimated as a function of the signal quality estimated for each interferer signal and as a function of the MCS determined for each interferer signal. Such processing accounts for the variability in interference cancellation performance at the wireless apparatus 12 as a function of varying interferer signal strengths and varying interferer MCS values—e.g., varying values of transport block formats (size, modulation, and coding rates).

In one or more examples of the method 600, for each interfering signal, the step of determining (Block 608) the MCS of each interferer signal comprises observing or otherwise determining past MCS values of the interferer signal and projecting the MCS value of the interferer signal for purposes of estimating (Block 610) the cancellation efficiency of the wireless apparatus 12 with respect to the interferer signal, based on the past MCS values. For example, projecting the MCS value of each interferer signal comprises projecting the MCS of the interferer signal based on observed statistics of the MCS distribution, as determined from the past MCS values of the interferer signal. This processing can be understood as a form of predicting or otherwise forecasting the MCS of each interferer signal, based on prior values of MCS observed for the interferer signal.

The receiver 38 may initialize its MCS determinations for a given interferer signal, e.g., a given other-cell interferer signal, using a worst-case assumption. Using this worst-case approach, the initial determination of MCS for the given interferer signal would assume that the interferer signal uses the highest-order modulation format and largest transport block size, from among a number predefined or otherwise known modulation formats and transport block sizes. The receiver 38 could then operate in a start-up period with respect to MCS determination for the given interferer signal, in which it filters its estimates of the interferer signal MCS for some time before it begins using its MCS determinations for estimating the actual CE of the receiver 38 with respect to the interferer signal.

In a particular example of determining the MCS of an interferer signal based on projection, the wireless apparatus 12 is configured, e.g., via its receiver processing circuit 42, to project the MCS value of each interferer signal by projecting the MCS of the interferer signal as one of: a maximum one of the past MCS values, a minimum one of the past MCS values, a mean of the past MCS values, a median of the past MCS values (or alternatively another percentile of the past MCS values), and a most recent one of the past MCS values. Here, the "past" values are MCS values previously observed and e.g., stored in a memory by the wireless apparatus 12, e.g., over some sliding window of time T, for the interferer signal.

The method 600 contemplates multiple mechanisms for determining the MCS of each interferer signal. Broadly, the receiver processing circuit 42 is configured to observe or otherwise determine the past MCS values of each interferer signal based on one or more of: receiving the MCS values of the interferer signal from a serving cell 26 in the network 10; determining the MCS values of the interferer signal by eavesdropping on control channel transmissions associated with the interferer signal; and determining the MCS values of the interferer signal from blind detection. Here, an "MCS value" may be a modulation order and/or coding rate used for a particular, defined MCS. In HSPA as a particular example, the MCS parameters include the number of codes allocated, the modulation format, precoding and rank parameters, and channel coding parameters. For a given MCS, any one or more of those parameters can be evaluated as an "MCS value." Thus, when determining the maximum, minimum, average or median "MCS value" used for a given interferer signal over a defined window of time, the wireless apparatus 12 may track any one or more of such parameters and perform statistical processing accordingly.

Further, regardless of how the MCS is determined for each interferer signal, it should be understood that the MCS so determined is not necessarily the actual, current MCS of the interferer signal. Instead, the MCS determined for each interferer signal should be understood as being the known or assumed (projected) for the interferer signal with respect to a transmission time of interest, such as an upcoming TTI or other time of interest associated with the network 10 performing LA responsive to the signal quality being reported by the wireless apparatus 12.

Further, the particular manner in which the wireless apparatus 12 determines the MCS of each interferer signal generally is unrelated to how the wireless apparatus 12 exploits knowledge of the MCS to better estimate the actual interference cancellation efficiency that is expected for the wireless apparatus 12 with respect to the interferer signal. In one such example of exploiting the MCS, the method 600 includes determining the cancellation efficiency expected for the wireless apparatus 12 with respect to each interferer signal based indexing into a LUT 48 according to the MCS value determined for the interferer signal. The LUT 48 maps MCS values, or parameters derived therefrom, to corresponding cancellation efficiency values. In one example, simulation or empirical evidence is used to characterize the cancellation efficiency of the wireless apparatus 12 as a function of interferer MCS, and the LUT 48 embodies that characterization.

Of course, as noted, the cancellation efficiency also depends on the signal quality of the interferer signal to be canceled, and the method 600 in one or more embodiments includes indexing into the LUT 48 for each interferer signal further according to the signal quality estimated for the interferer signal. In such embodiments, the LUT 48 includes different sets of cancellation efficiency values for different signal quality ranges or values. Correspondingly, in one or more embodiments, the step of estimating (Block 604) the signal quality of each interferer signal comprises: estimating a propagation channel of the interferer signal; estimating a signal covariance of the interferer signal; and computing the signal quality of the interferer signal as a function of the propagation channel and the signal covariance estimated for the interferer signal. The signal covariance of each interferer signal can be estimated based on identifying or detecting signal correlations for the interferer signal across respective pairs of the parallel signal processing paths 60 within the receiver 38.

Now, in one or more embodiments, the desired signal is an own-cell or serving-cell downlink signal 28 received at the wireless apparatus 10 and the one or more interferer signals are other-cell downlink signals 28 transmitted in one or more neighboring cells 26 within the network 10. Thus, in an example context the desired signal originates from a serving cell 26 for the wireless apparatus 12 in the network 10 and each interfering signal originates from an interfering cell 26 in the network 10. In at least one such embodiment, the method 600 includes determining the cancellation efficiency with respect to each interferer signal further based on a ratio of data and control signal powers for the corresponding interfering cell 26. In another embodiment, the desired signal is an own-cell wireless device uplink signal and the one or more interfering signals are other-cell wireless device uplink signals.

Still further, in the same or other embodiments, the step of estimating (Block 604) the impairment covariance of the desired signal is estimated after partial interference cancellation with respect to interfering common and control channel signal interference in the received signal. With this approach, the one or more interferer signals are interfering data signals from the neighboring cells 26, and the impairment covariance is estimated for the desired signal with respect to the interfering data signals and the impairment covariance correction terms are calculated with respect to the interfering data signals.

Of course, such details represent a non-limiting example of estimating interferer signal quality and the teachings herein can be understood broadly in at least some embodiments as improving the instantaneous scheduling quality within the network 10, based on the wireless apparatus 12 modifying the CQI that it reports to the network 10, to reflect the projected IC gains for the actual channel conditions and interferer MCS. Such improved reporting thus improves the network's ability to the match the scheduled MCS of the wireless apparatus 12 to the actual SINR achievable at the wireless apparatus 12 after IC.

To provide improved CQI reporting, the wireless apparatus modifies its linear SINR estimate by removing the effect of the estimated cancelable power from one or more interferer signals. This correction is carried out by removing impairment covariance terms in the SINR computation expression that correspond to the one or more partially cancelable interferer signals, and the power scaling of each cancelable interference term is estimated from the correspondingly estimated CE at the wireless apparatus 12, which CE is a function of the interferer signal's signal quality at the wireless apparatus and the MCS determined for interferer signal. The modified SINR value is then used for CQI reporting.

Consider FIG. 7, which illustrates a method 700 as a reiteration of the method 600 in the specific context of other-cell interference within a cellular network. Before discussing details of FIG. 7, it should be understood that certain steps may be performed in an order other than that illustrated, and that at least some the illustrated processing steps may be performed in parallel with each other, or in parallel with other processing at the wireless apparatus 12. (The same qualifications apply with respect to the method 600 as shown in FIGS. 6a and 6b.)

Processing begins in the method 700 with receiving a signal from the network 10 (Block 702). The received signal includes an own-cell signal as a desired signal and one or more other-cell signals as interferer signals, and processing continues with estimating an (initial) impairment covariance of the desired signal (Block 704). Blocks 706, 708, 710 and 712 are performed for each interferer signal of interest (i.e., repeated or performed in parallel). Here, there are N other cells 26 which are interferer cells, and these blocks are performed for each cell n, where n=1 ... N and N is greater than or equal to 1. These blocks include estimating the cell-specific signal quality of each respective interferer signal (Block 706), SINRn, determining the MCS of each respective interferer signal, MCSn (Block 708), and determining or estimating the CE, $\rho_n$, expected of the wireless apparatus 12 for each respective interferer signal (Block 710).

Now, a traditional linear SINR estimate for a received signal of interest may be computed according to the formula:

$$SINR_{lin} = \frac{w_{lin}^H \hat{h}}{w_{lin} \hat{R}_u w_{lin}^H}$$

where the combining weights $w_{lin} = \hat{R}_u^{-1} \hat{h}$ are based on the channel estimates $\hat{h}$ for the signal of interest and the impairment covariance estimate $\hat{R}_u$ for the signal of interest, where the latter includes all interference. The channel and covariance estimates are produced according to methods known in the state of the art, e.g. channel estimation based on a Common Pilot Channel (CPICH) and non-parametric impairment covariance estimation. The above equation can be used in Block 706, to estimate the cell-specific signal quality of each other-cell interferer signal, except that covariance estimate for the interferer signal is used instead of an estimate of impairment covariance for the signal of interest (desired signal), and the channel estimates at issue are for the interferer signal.

Notably, however, in Block 718, the wireless apparatus 12 does not report a conventionally computed SINR for desired-signal quality reporting. Instead, it reports a modified, IC-aware SINR estimate, as computed in Block 716. The IC-aware SINR estimate, $SINR_{IC}$, is computed similarly to the conventionally estimated SINR, but it advantageously subtracts the cancelable interference contribution of the interferer signals from the impairment covariance that was initially estimated for the desired signal. This compensation may be expressed as $$SINR_{IC} = \frac{w_{IC}^H \hat{h}}{w_{IC} \hat{R}_{u,IC} w_{IC}^H}$$

where $w_{IC} = \hat{R}_{u,IC}^{-1} \hat{h}$, and where $\hat{R}_{u,IC} = \hat{R}_u - \hat{R}_{canc}$. In turn, $\hat{R}_{canc} = \sum_{n=1}^N \hat{R}_{canc,n}$, for n=1, ..., N. Thus, in the context of this example, $\hat{R}_{canc,n}$ will be understood to be the cell-specific (cell n) correction term computed in Block 712 for each interferer signal n, and $\hat{R}_{u,IC}$ will be understood as being the compensated impairment covariance, such as computed in the method 700 in Block 714. Block 714 refers to this value as a "corrected" covariance, denoting that the initial estimate of impairment covariance of the desired signal is corrected for the expected CE of the receiver 38 with respect to the interferer signals.

The manner in which an impairment covariance correction term, $\hat{R}_{canc,n}$, is computed for each interferer signal n is an interesting aspect of the teachings herein. Regarding Block 704, let the estimate of the impairment covariance of the desired signal, $\hat{R}_u$, be represented as a total impairment term consisting of contributions from the own cell (cell 0, no index) and N neighbor cells, plus a non-modeled term:

$$R_u = R_{u,0} + \sum_{n=1}^N R_{u,n} + R_n = R_{u,0} + \sum_{n=1}^N E_{t,n} h_n h_n^H + R_n,$$

where $E_{t,n}$ is the transmitted power in cell n. Denoting the CE value of the wireless apparatus 12 with respect to the interferer signal n from cell n as $\rho_n$, the impairment covariance correction term of Block 712 may be modeled as $\hat{R}_{canc,n} = \rho_n E_{t,n} h_n h_n^H$. The total correction is then computed by summing the individual impairment covariance correction terms computed for the interferer signals n=1, ..., N, given as $$\hat{R}_{canc} = \sum_{n=1}^N \rho_n \hat{E}_{t,n} \hat{h}_n \hat{h}_n^H.$$

One sees the determination of the corrected impairment covariance of the desired signal calculated in Block 714, i.e., $\hat{R}_{u,IC} = \hat{R}_u - \hat{R}_{canc} = \hat{R}_u - \sum_{n=1}^N \hat{R}_{canc,n}$.

Now, assume that the interferer signals being canceled are data signals carrying traffic data, the contents of which are unknown to the wireless apparatus 12. Assuming that the receiver 38 performs soft IC of traffic data on the N interfering cells, the impact of IC processing may be compactly characterized by the CE achieved for traffic data, which is denoted as $$\rho_d = 1 - E|s_k - \hat{s}_k|^2,$$

where the "d" subscript on the CE, $\rho$, denotes the CE of the receiver 38 for data signal cancellation, and where $s_k$ and $\hat{s}_k$ are the unit-power normalized true transmitted symbol and the soft-mapped canceled symbol value in the receiver 38, respectively, and "E" denotes the mean or expected value. The CE values typically fall in the range 0 ... 1. Typically, higher SINR for the interfering signal being canceled leads to higher CE. Further, higher CE is obtained when the interferer signal has an MCS with fewer codes, lower modulation format, and/or lower coding rates.

The CE values for data IC may be pre-computed for the receiver 38, for all defined MCSs—e.g., in terms of their transport formats and coding rates. Further, such performance may be characterized according to interferer SINR. These CE characterizations can be represented within an LUT 48. By knowing or estimating the relevant MCS and SINR values for an interferer signal, the receiver 38 can use index into the LUT 48 to obtain the correspondingly expected $$\rho_{d,n} = LUT(SINR_n, MCS_n).$$

Figure 8:
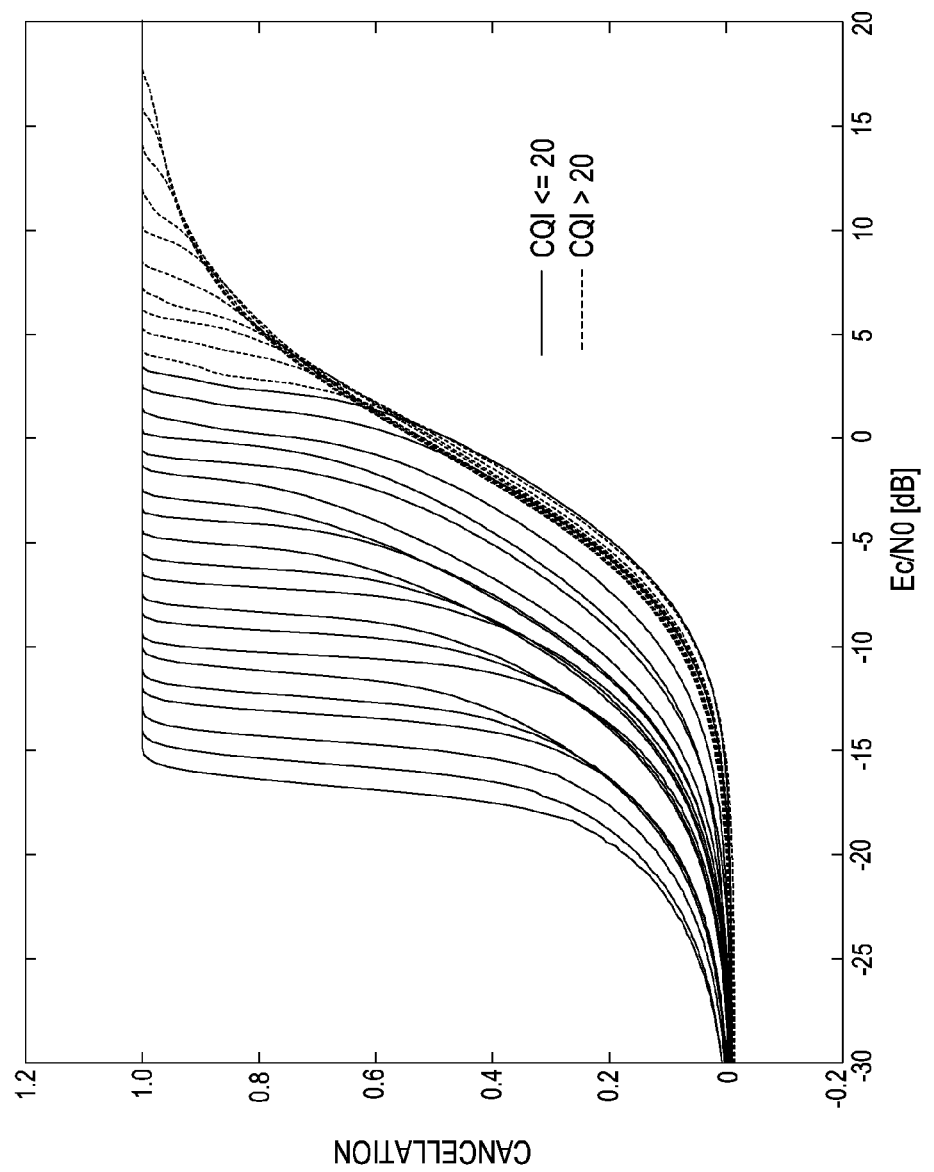
FIG. 8 is a plot of cancellation efficiency values versus interferer signal qualities, such as may be characterized for a given interference-cancellation receiver type and embodied in a contemplated look-up table.

FIG. 8 illustrates an example set of curves/mappings, for determining CE. In more detail, the diagram presents a plot of CE values versus interferer signal qualities, such as may be characterized for any given implementation of the receiver 38 within the wireless apparatus 12. The CE curves may be embodied as corresponding sets of values in the LUT 48, with each curve corresponding to a certain MCS. The dashed lines correspond to the highest MCS values.

In addition to data IC, common and control channels from other cells 26 may also be canceled by the receiver 38. Denoting the data power and common/control power estimates for cell n by $\hat{E}_{d,n}$ and $\hat{E}_{c,n}$, respectively, the total CE for cell n, $\rho_n$, may then be estimated as $$\rho_n = \frac{\rho_{d,n}\hat{E}_{d,n} + \hat{E}_{c,n}}{\hat{E}_{t,n}}.$$

The data, control, and total power parameters for the interfering cells 26 are estimated by the receiver using methods known in the art, for example. In at least some embodiments, they may be assumed to be the same as the values for the own cell 26, which originates the desired signal.

If some of the N cells 26 are not included in IC (or in data IC), the corresponding CE is zero. In other words, $\rho_n = 0$ (or $\rho_{d,n} = 0$), if cell n is excluded.

In some embodiments, the initial linear $\hat{R}_u$ and $\hat{E}_{t,n}$, etc. are estimated from a signal where the common and control channels have already been removed—i.e., preliminary interference cancellation has been performed. In that case the total CE is given by $$\rho_n = \rho_{d,n}\frac{\hat{E}_{d,n}}{\hat{E}_{t,n}}.$$

As for determining the MCS of a given interferer signal, in general its actual or future MCS are unknown and cannot be predicted with complete accuracy. However, it is advantageously recognized herein that several practical approaches allow the wireless apparatus 12 and network 10 to harvest attractive throughput gains, based on the realization that the CE for many MCSs is similar. Consequently, the channel conditions at the wireless apparatus 12 with respect to a given interferer signal predominantly determine the CE that the wireless apparatus 12 will achieve with respect to that interferer.

Thus, in one or more embodiments, the wireless apparatus 12 collect MCS values (e.g., transport format and coding rate statistics) for each of the N interfering cells 26, within a sliding window. The sliding window length (e.g., defined in TTIs) may fixed or may depend on traffic variability, vehicular speed, etc. For each interfering cell n, the assumed MCS value in the LUT operation may be determined as any one of: the minimum observed MCS value from cell n; the maximum observed MCS value from cell n; the median of the observed MCS values for cell n; the mean of the observed MCS values; the most recently observed MCS value; or some other percentile or statistically derived value of the observations.

In at least one embodiment, the wireless apparatus 12 determines the MCS of a given interferer signal for a given signal quality reporting period based on the maximum transport block size and coding rate seen over the current or most recent observation period for the given interferer signal. This maximum value is used as the LUT argument to retrieve the expected CE, $\rho_{d,n}$.

The above processing and related variations thereof provide better throughput performance in the network 10, particularly as the network 10 operates with more wireless apparatuses 12 as configured herein. These gains are achieved in comparison to the throughput achieved with conventional reporting from IC-canceling apparatuses, which relies on the application of a long-term averaged offset to SINR. That conventional reporting does not do a good job of capturing variable IC gains because such gains are channel-dependent. In contrast, the teachings herein use channel conditions—particularly SINR or other signal quality estimate—for interferer signals to more accurately estimate the expected CE of a wireless apparatus 12 with respect to such interferer signals. While the disclosed wireless apparatus 12 generally is not able to predict the exact future MCS of such interferers, the teachings herein nonetheless allow the wireless apparatus 12 to predict the instantaneous CE of the wireless apparatus 12 with good fidelity, based on assuming similar channel conditions a few TTIs into the future.

As noted, the disclosed teachings apply also to receiver configurations where the impairment covariance, $\hat{R}_u$, as initially estimated for the desired signal is based on a partially interference-canceled input signal (e.g. the common/control channels removed), and the subsequent correction therefore only account for data IC in the future TTI. Further, while the foregoing examples used the HSPA downlink and/or the LTE downlink as examples, the teachings herein directly apply to other Radio Access Technologies (RATs). Additional scenarios applicable to the teachings herein include uplink multi-user (MU)/multi-cell and downlink MU-MIMO. As such, the invention may be implemented on the mobile device side and/or network side of a communication network.

The teachings can be broadly understood as providing a method of SINR estimation in an IC-capable receiver where the SINR estimate is computed using a corrected interference estimate. The correction accounts for projected removal of one or more interference components. Further, the correction may be performed by multiplying one or more cell-specific signal covariance matrix components with respective cell-specific scaling factors and subtracting them from an initial impairment covariance estimate. Still further, the scaling factor is based on the projected cancellation efficiency for the interfering cell signal, and the projected cancellation efficiency is based on the interfering signal's SINR at the wireless apparatus 12 and the projected MCS of the interfering signal. In a particular but non-limiting example, the MCS projected for a given interfering signal is based on observed statistics of the MCS distribution in the interfering cell 26. The reported CQI is based on the compensated, IC-aware SINR.

According to the method of CQI reporting taught herein, the reported CQI is more accurate and the actual instantaneous BLER at the wireless apparatus 12 therefore fluctuates less around the target BLER. Correspondingly, the network 10 is better able to perform maximum data rate scheduling for high-SINR TTIs at the wireless apparatus 12. That is, in a cellular network example, the CQI reporting modification taught herein accounts for the IC capability of the wireless apparatus 12 and is therefore better tuned to the instantaneous channel conditions for the own and interfering cells, as compared to simply assuming an average, constant CQI correction term.

Of course, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a wireless apparatus configured for operation in a wireless communication network, the method comprising:
   receiving a signal from the wireless communication network that includes a desired signal and one or more interferer signals;
   estimating an initial impairment covariance of the desired signal;
   for each interferer signal:
      estimating a signal quality of the interferer signal;
      determining a modulation and coding scheme, MCS, of the interferer signal;
      estimating a cancellation efficiency of the wireless apparatus with respect to the interferer signal, based on the signal quality and MCS of the interferer signal; and
      calculating an impairment covariance correction term corresponding to the interferer signal, by computing the signal covariance of the interferer signal and scaling the signal covariance according to the cancellation efficiency;
   obtaining a compensated impairment covariance for the desired signal by subtracting each impairment covariance correction term from the initial impairment covariance;
   estimating a signal quality of the desired signal as a function of the compensated impairment covariance; and
   reporting the signal quality of the desired signal to the wireless communication network.

2. The method of claim 1, wherein, for each interferer signal, the step of determining the MCS of the interferer signal comprises observing or otherwise determining past MCS values of the interferer signal and projecting the MCS value of the interferer signal for purposes of estimating the cancellation efficiency of the wireless apparatus with respect to the interferer signal, based on the past MCS values.

3. The method of claim 2, wherein projecting the MCS value of each interferer signal comprises projecting the MCS of the interferer signal based on observed statistics of the MCS distribution, as determined from the past MCS values of the interferer signal.

4. The method of claim 2, wherein projecting the MCS value of each interferer signal comprises projecting the MCS of the interferer signal as one of: a maximum one of the past MCS value, a minimum one of the past MCS values, a mean of the past MCS values, a median of the past MCS values, and a most recent one of the past MCS values.

5. The method of claim 2, wherein observing or otherwise determining the past MCS values of each interferer signal comprises one or more of: receiving the MCS values of the interferer signal from a serving cell in the wireless communication network; determining the MCS values of the interferer signal by eavesdropping on control channel transmissions associated with the interferer signal; and determining the MCS values of the interferer signal from blind detection.

6. The method of claim 1, wherein estimating the cancellation efficiency expected for the wireless apparatus with respect to each interferer signal comprises indexing into a look-up-table, LUT, according to the MCS value determined for the interferer signal, wherein the LUT maps MCS values, or parameters derived therefrom, to corresponding cancellation efficiency values.

7. The method of claim 6, comprising indexing into the LUT for each interferer signal further according to the signal quality estimated for the interferer signal, and wherein the LUT includes different sets of cancellation efficiency values for different signal quality ranges or values.

8. The method of claim 1, wherein the wireless apparatus comprises an interference-canceling receiver having two or more parallel signal paths, and wherein estimating the initial impairment covariance of the desired signal is based on determining corresponding impairment correlations between respective pairs of the two or more parallel signal paths, and wherein and estimating the signal covariance for each of the one or more interferer signals is based on determining corresponding signal correlations between respective pairs of the two or more parallel signal paths.

9. The method of claim 1, wherein the desired signal originates from a serving cell for the wireless apparatus in the wireless communication network and each interferer signal originates from an interfering cell in the wireless communication network.

10. The method of claim 9, wherein the cancellation efficiency determined with respect to each interferer signal is further determined based on a ratio of data and control signal powers for the corresponding interfering cell.

11. The method of claim 1, wherein the step of estimating the initial impairment covariance of the desired signal is performed after partial interference cancellation with respect to interfering common and control channel signal interference in the received signal, so that the one or more interferer signals are interfering data signals and the impairment covariance is estimated for the desired signal with respect to the interfering data signals and the impairment covariance correction terms are calculated with respect to the interfering data signals.

12. The method of claim 1, wherein, for each interferer signal, said step of estimating the signal quality of the interferer signal comprises:
   estimating a propagation channel of the interferer signal;
   estimating a signal covariance of the interferer signal; and
   computing the signal quality of the interferer signal as a function of the propagation channel and the signal covariance estimated for the interferer signal.

13. A wireless apparatus configured for operation in a wireless communication network and comprising an interference-canceling receiver that includes:
   a receiver front-end circuit configured to receive a signal from the wireless communication network, said received signal including a desired signal and one or more interferer signals; and
   a receiver processing circuit operatively associated with the receiver front-end circuit and configured to:
      estimate an impairment covariance of the desired signal;

for each interferer signal:
  estimate a signal quality of the interferer signal;
  determine a modulation and coding scheme, MCS, of the interferer signal;
  estimate a cancellation efficiency of the wireless apparatus with respect to the interferer signal, based on the signal quality and MCS of the interferer signal; and
  calculate an impairment covariance correction term corresponding to the interferer signal, by computing the signal covariance of the interferer signal and scaling the signal covariance according to the cancellation efficiency;
obtain a compensated impairment covariance for the desired signal by subtracting each impairment covariance correction term from the impairment covariance;
estimate a signal quality of the desired signal as a function of the compensated impairment covariance; and
report the signal quality of the desired signal to the wireless communication network.

14. The wireless apparatus of claim 13, wherein, for each interferer signal, the receiver processing circuit is configured to determine the MCS of the interferer signal by observing or otherwise determining past MCS values of the interferer signal and projecting the MCS value of the interferer signal for purposes of estimating the cancellation efficiency of the wireless apparatus with respect to the interferer signal, based on the past MCS values.

15. The wireless apparatus of claim 14, wherein the receiver processing circuit is configured to project the MCS value of each interferer signal based on observed statistics of the MCS distribution, as determined from the past MCS values of the interferer signal.

16. The wireless apparatus of claim 14, wherein the receiver processing circuit is configured to project the MCS value of each interferer signal as one of: a maximum one of the past MCS value, a minimum one of the past MCS values, a mean of the past MCS values, a median of the past MCS values, and a most recent one of the past MCS values.

17. The wireless apparatus of claim 14, wherein the receiver processing circuit is configured to observe or otherwise determine the past MCS values of each interferer signal based on one or more of: receiving the MCS values of the interferer signal from a serving cell in the wireless communication network; determining the MCS values of the interferer signal by eavesdropping on control channel transmissions associated with the interferer signal; and determining the MCS values of the interferer signal from blind detection.

18. The wireless apparatus of claim 13, wherein the receiver processing circuit is configured to estimate the cancellation efficiency expected for the wireless apparatus with respect to each interferer signal by indexing into a look-up-table, LUT, according to the MCS value determined for the interferer signal, wherein the LUT maps MCS values, or parameters derived therefrom, to corresponding cancellation efficiency values.

19. A non-transitory computer-readable medium storing a computer program comprising computer program instructions that when executed by a receiver processing circuit in a wireless apparatus configures the wireless apparatus to:
  receive a signal from a wireless communication network, where the received signal includes a desired signal and one or more interferer signals;
  estimate an impairment covariance of the desired signal;
  for each interferer signal:
    estimate a signal quality of the interferer signal;
    determine a modulation and coding scheme, MCS, of the interferer signal;
    estimate a cancellation efficiency of the wireless apparatus with respect to the interferer signal, based on the signal quality and MCS of the interferer signal; and
    calculate an impairment covariance correction term corresponding to the interferer signal, by scaling the signal covariance of the interferer signal according to the cancellation efficiency;
  obtain a compensated impairment covariance for the desired signal by subtracting each impairment covariance correction term from the impairment covariance;
  estimate a signal quality of the desired signal as a function of the compensated impairment covariance; and
  report the signal quality of the desired signal to the wireless communication network.

* * * * *

UNITED STATES PATENT AND TRADEMARK OFFICE
CERTIFICATE OF CORRECTION

| | | |
|---|---|---|
| PATENT NO. | : 8,995,499 B2 | Page 1 of 1 |
| APPLICATION NO. | : 13/930686 | |
| DATED | : March 31, 2015 | |
| INVENTOR(S) | : Reial et al. | |

It is certified that error appears in the above-identified patent and that said Letters Patent is hereby corrected as shown below:

Specification

In Column 10, Line 59, delete "apparatus 10" and insert -- apparatus 12 --, therefor.

In Column 14, Line 35, delete "apparatus 10" and insert -- apparatus 12 --, therefor.

Signed and Sealed this
Nineteenth Day of January, 2016

Michelle K. Lee
*Director of the United States Patent and Trademark Office*